(12) United States Patent
Carlson

(10) Patent No.: US 6,728,206 B1
(45) Date of Patent: Apr. 27, 2004

(54) CROSSBAR SWITCH WITH COMMUNICATION RING BUS

(75) Inventor: John R. Carlson, Fremont, CA (US)

(73) Assignee: Silicon Grpahics, Inc., Mountain View, CA (US)

( * ) Notice: Subject to any disclaimer, the term of this patent is extended or adjusted under 35 U.S.C. 154(b) by 0 days.

(21) Appl. No.: 09/128,392

(22) Filed: Aug. 3, 1998

(51) Int. Cl.[7] .............................................. H04L 12/26
(52) U.S. Cl. ...................................... 370/222; 370/423
(58) Field of Search ................................ 370/380, 423, 370/424, 221–222, 401–404; 340/825.79, 825.85

(56) References Cited

U.S. PATENT DOCUMENTS

| | | | | |
|---|---|---|---|---|
| 5,084,863 A | * | 1/1992 | Guezou et al. ............. | 370/223 |
| 5,442,628 A | * | 8/1995 | Anderson et al. ............ | 370/56 |
| 5,539,733 A | * | 7/1996 | Anderson et al. .......... | 370/58.2 |
| 5,583,867 A | * | 12/1996 | Poole ......................... | 370/257 |
| 5,590,123 A | * | 12/1996 | Lyles et al. .................. | 370/397 |
| 5,689,644 A | * | 11/1997 | Chou et al. ............. | 395/200.06 |
| 6,246,692 B1 | * | 6/2001 | Dai et al. .................... | 370/438 |
| 6,262,820 B1 | * | 7/2001 | Al-Salameh ................ | 359/119 |

* cited by examiner

Primary Examiner—Alpus H. Hsu
Assistant Examiner—Toan D. Nguyen
(74) Attorney, Agent, or Firm—Baker Botts L.L.P.

(57) ABSTRACT

A crossbar bus network of nodes is coupled to a crossbar switch circuit that operates as a communications hub routing messages simultaneously to and from the nodes over multiple links. The crossbar switch circuit includes a dedicated communications bus ring adapted to transmit data such as programmed input/output (PIO) messages between components of said crossbar switch circuit. The communications bus ring can be used for secondary high latency data communications thereby freeing switching matrix links of the crossbar switch circuit for simultaneous unimpeaded important low latency data communications to the same device.

24 Claims, 8 Drawing Sheets

CROSSBAR SWITCH WITH COMMUNICATION RING BUS

FIELD OF THE INVENTION

The present invention relates to the field of bus switches. More particularly, the present invention relates to a crossbar bus network including a crossbar switch circuit comprising a communication bus ring.

BACKGROUND OF THE INVENTION

Efficient communication of information is critical to the advancement of a modern society. For example, electronic technologies that require significant amounts of data to be communicated at a rapid pace are utilized in a growing number of diverse applications to accomplish useful tasks. Advances in electronic devices for processing and transmitting electrical signals have increased the demand for even greater data communication bandwidth in a variety of areas, including telecommunications and computer systems.

Computer systems are used to perform a wide variety of tasks and play an important role in analyzing and communicating data, ideas and trends in most areas of business, science, education and entertainment. In the past, computers were primarily applied to rather mundane, repetitive numerical and/or textual tasks involving spread sheets and word processors. More recently computers are being utilized in more advanced, versatile, and sophisticated applications. A partial list of areas impacted by these applications include the generation of special effects for movies, realistic computer-generated three-dimensional graphic images and animation, real-time simulations, video teleconferencing, Internet-related applications, computer games, telecommuting, virtual reality, high-speed databases, real-time interactive simulations, medical diagnostic imaging, etc. The usefulness of a computer in performing some of these tasks is largely determined by the speed at which the computer performs.

There are a number of factors that affect the speed at which a computer performs. For example the capacity and speed of a central processing unit has a notable impact on a computer's performance. Another factor that has a significant influence on a computer's performance is the data communications bandwidth, that is the speed at which the communications infrastructure permits the various components of a computer system to communicate with one another. One of the major bottlenecks in attaining faster computer systems with greater bandwidth is prior art bus architectures.

Typically a "bus" is comprised of one or more wires that electrically interconnect components of a computer system, such as semiconductor chips and input/output devices. Virtually all of today's computer systems use this same type of bus scheme. The bus conducts electrical signals that enable various components in the computer system to communicate with each other. The computer system components often use the bus to convey digital data, address information for specifying the destination of the data, control signals, and timing/clock signals. The components utilizing the bus for communications are usually attached to the bus in a linear configuration and are subject to an arbitration process. At any given time the arbitration process permits only one component to transmit a message to one other component coupled to the bus.

FIG. 1 shows a schematic of a typical prior art computer graphics system 100. Computer graphics system 100 comprises a central processing unit (CPU) 101, a main memory 102, graphics controller 103, frame buffer 104, mass storage device 105, keyboard controller 106, keyboard 108, printer 109 and display monitor 110, all of which are coupled to bus 107. CPU 101 handles most of the control and data processing. Main memory 102 provides a convenient method of storing data for quick retrieval by CPU 101. Graphics controller 103 processes image data in pipelined stages. Frame buffer 104 stores pixel parameter values. Mass storage device 105 stores data associated with multiple images and applications. Keyboard controller 106 controls keyboard 108, which operates as an input device. Printer 109 prints hard copies of graphical images and display monitor 110 displays graphical images.

Bus 107 enables components coupled to the bus to communicate with each other by carrying electrical signals between them. For instance, CPU 101 may send a signal over bus 107 to retrieve certain data stored in main memory 102. Upon receipt of this read request, main memory 102 sends the requested data back via bus 107 to CPU 101. Once the CPU is finished processing the data, a signal can be sent again via bus 107 to graphics 3controller 103 and then onto frame buffer 104 and display monitor 110 resulting in the processed data being displayed. In FIG. 1 all of the components share a common bus 107 and they all rely on the arbitration process to meet their individual communication needs.

Relying on this prior art bus architecture and its arbitration process means that only one component can have access to the bus at any given time for a one way communication, regardless of communication requirements of any other components. If one component is utilizing bus 107 a significant delay can occur in meeting the individual communication needs of the other components. For example, if bus 107 is currently busy transmitting signals between devices (e.g. CPU 101 and printer 109), then all the other devices coupled to that bus must wait until that transaction is complete and bus 107 again becomes available. Once the bus becomes available the remaining devices are subject to an arbitration process which determines whether a component gains access to bus 107. The arbitration process and bus architecture of the prior art is not able to keep pace with the skyrocketing craving for increased bus access and bandwidth.

Increasing the bus width introduces severe detrimental "side effects" that significantly impact the overall efficiency of the computer system. The increase in bus width consumes valuable space on already densely packed and overcrowded printed circuit boards. Additional pins are required on each of the semiconductor chips connected to the bus in order to match the increase in bus width. These additional pins significantly increase the size of the chips and it becomes more difficult to fit these chips onto the printed circuit boards. Furthermore, the increase in the chip's overall size and number of pins adversely affects the costs of manufacturing chip packages. For the typical computer system, increasing the bus width from 64 bits up to more desirable bandwidth capabilities (e.g., 128 bits wide) is impractical.

Increasing the frequency also increases the probability that undesirable results could significantly impact the operation of the computer system. The physics associated with implementing long sets of parallel wires with multiple electrical signals produces a wide range of problems such as impedance, mismatches, reflections, crosstalk, noise, non-linearities, attenuations, distortions, timing issues, etc. These problems become even more severe as the frequency increases. Utilizing higher frequencies requires fine tuning extremely tight tolerances, utilizing exotic micro-chip layouts, and extensive testing, which makes higher frequency computers extremely difficult to reliably mass produce and impractical. As a practical matter the highest attainable frequency in a typical computer systems is approximately 33–50 Mhz. Given a 64 bit bus running at 50 Mhz, the highest attainable data rate would be approximately 400 Mbytes per second. The data rate demands imposed by desirable new applications exceeds these limitations.

Thus, there is a great need for a bus architecture that provides increased data communications bandwidth in a reliable, cost effective, and extremely efficient manner. The bus should be capable of providing high speed data communications with minimal latency problems. The bus architecture should be adaptable to wide variety of systems and have the ability to satisfy the data communication bandwidth requirements of the diverse components and unique devices that may be incorporated in a computer system.

SUMMARY OF THE INVENTION

The present invention is an efficient system and method that increases the speed at which bits of data can be conveyed (e.g., increased bandwidth) in an electronic system by permitting multiple components to effectively communicate with one another at the same time. The present invention involves a multi-link architecture that is capable of providing high speed data communications with low latency characteristics in a reliable, cost effective, and efficient manner. The present multi-link architecture is adaptable to various data communications applications (such as networks and computer systems) and can satisfy the unique data communication bandwidth requirements of a wide variety of devices in a network system.

In one embodiment a crossbar bus network of nodes is coupled to a crossbar switch circuit that operates as a communications hub routing messages simultaneously to and from the nodes over multiple links. The crossbar switch circuit includes a dedicated communications bus ring adapted to transmit data such as programmed input/output (PIO) messages between components of said crossbar switch circuit. The communications bus ring can be used for secondary high latency data communications thereby freeing switching matrix links of the crossbar switch circuit for simultaneous unimpeaded important low latency data communications to the same device.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Figure 1:
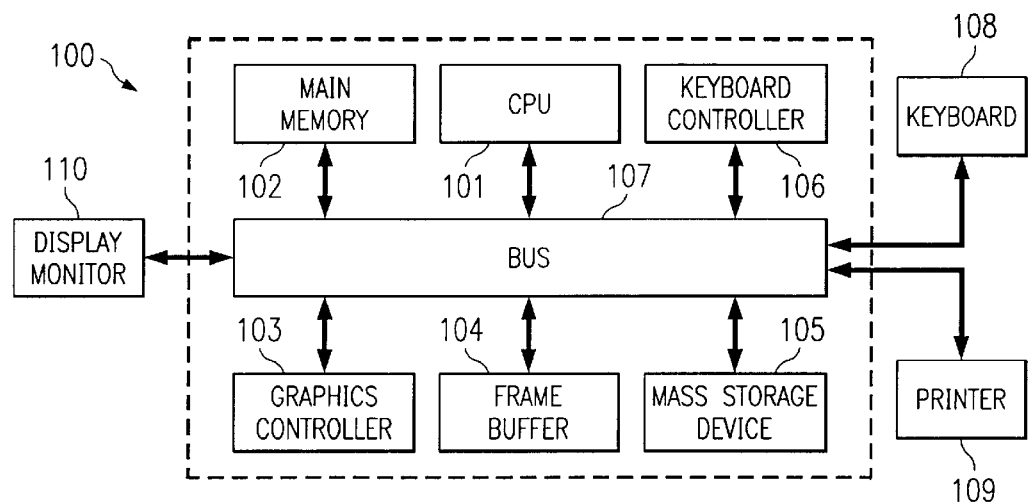
FIG. 1 shows a schematic of one embodiment of prior art computer graphics system 100.

Reference will now be made in detail to the preferred embodiments of the invention, a crossbar switch with communication ring bus, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is an efficient system and method that increases the speed at which bits of data can be conveyed (e.g., increased bandwidth) in an electronic system (e.g., a computer or telecommunications system) by permitting multiple components to effectively communicate with one another at the same time. These communications take place in a multi-link network architecture that is capable of providing high speed data communications with low latency characteristics in a reliable, cost effective, and efficient manner. The present multi-link network architecture is adaptable to various data communications applications and can satisfy the unique data communication bandwidth requirements of a wide variety of devices coupled to the system.

In one embodiment of the present invention, a crossbar switch circuit is utilized to implement multiple temporary links between crossbar bus network components. The links usually only last long enough for the components to complete their communication. The present embodiment is based on a switching matrix configuration. Such a switching matrix arrangement is described in the patent application entitled "Packet Switched Router Architecture For Providing Multiple Simultaneous Communications", Ser. No. 08/717580, filed on Sep. 23, 1996 and assigned to the assignees of the present invention. Rather than having a single linear bus configuration, a central "switchboard"

(crossbar switch circuit) arrangement is used to select and establish multiple links between a variety of devices or components in the computer system. By selecting and establishing multiple links, the central switchboard allows multiple packets of information to be sent to various components simultaneously.

With the basic architecture and protocol established, there remains other unique, novel features which can be leveraged to gain even greater performance characteristics. Some of these features are disclosed in a patent application entitled "Packetized Data Transmissions In A Switched Router Architecture" Ser. No. 08/780,785 filed on Jan. 9, 1997 and "A Guaranteed Bandwidth Method In A Computer System For Input/Output Data Transfers", Ser. No. 08/717,581, filed on Sep. 23, 1996 and assigned to the assignees of the present invention. The present embodiment provides a system and method that enhances the performance of a crossbar bus network by including additional communication paths to particular components of a crossbar bus network.

In the present embodiment the additional communications paths are established by utilizing a communications bus ring in a crossbar switch circuit. The additional communication paths to a component of the crossbar bus network achieve even greater communication efficiencies by permitting multiple simultaneous communications to a particular component as well as communications between multiple components. For example, one communication path to a device can be used for secondary high latency data communications thereby freeing up another link for simultaneous unimpeaded important low latency data communications to the same device.

In the present embodiment the communication paths are primarily utilized as a programmable input/output (PIO) communications path for transferring PIO messages. PIO messages address a number of issues including switch matrix control, configuration directions and performance analysis. The PIO communications path transmits these slow, high latency messages thereby "freeing" (enabling) other links in the crossbar bus network to transmit additional data communications since they are not being tied up with PIO communications. Thus, the present embodiment of a crossbar bus network provides the ability to communicate more information in a shorter period of time since devices do not necessarily have to wait for another device to finish its data communication first.

Figure 2:
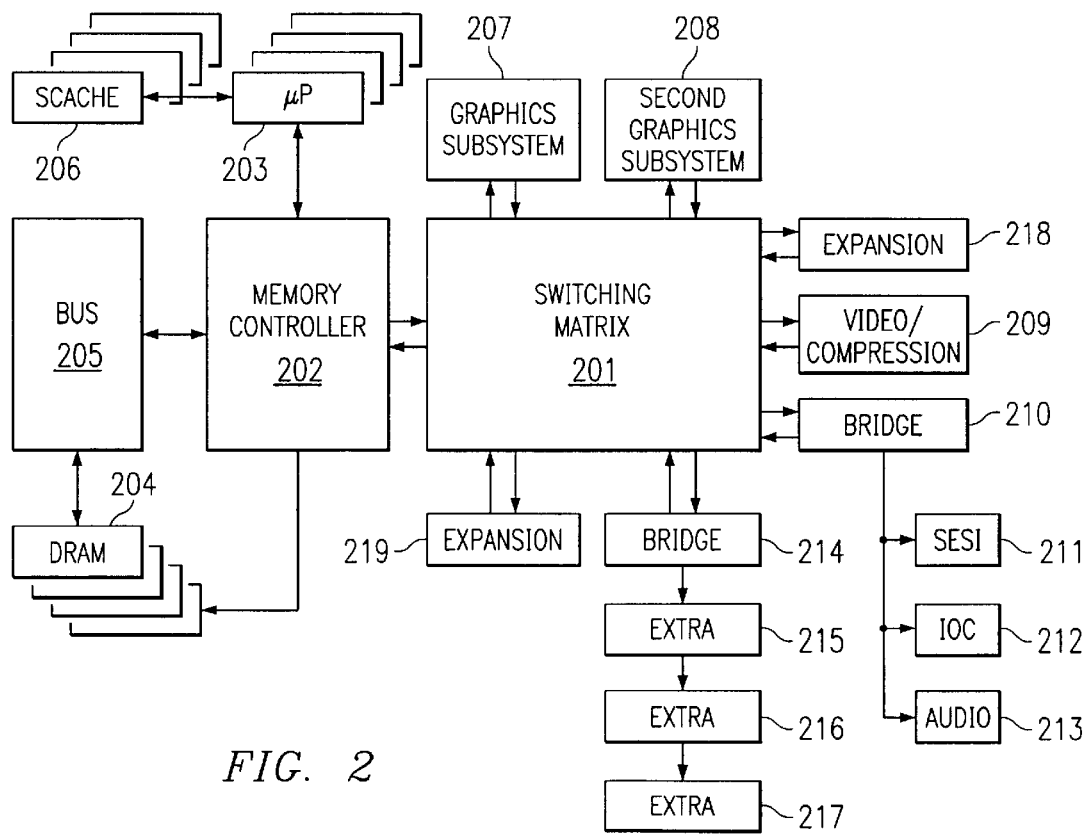
FIG. 2 is an exemplary illustration of one embodiment of a computer system configuration to which the present invention may be applied.

It should be further noted that there exists many different computer system configurations to which the present invention may be applied. One such exemplary computer system is shown in FIG. 2. In this embodiment a crossbar switch is implemented as a switched packet router 201 with a pair of direct point-to-point connections to memory controller 202. Memory controller 202 facilitates the transfer of data between one or more microprocessors 203 and main memory 204, which is comprised of DRAM SIMMs. A high-speed (e.g., 1 GByte/sec) multiplexer 205 is used to couple memory controller 202 with the actual main memory 204. To improve performance, the microprocessors 203 can temporarily cache data in the SCache 206. Other components or devices which may be connected to switched packet router 201 include one or more graphics subsystems 207–208. The graphics subsystems 207–208 perform functions such as scan conversion, texturing, anti-aliasing, etc. Furthermore, a video board 209 having compression/decompression capabilities can be connected to switched packet router 201. The bridge 210 acts as an interface so that various off-the-self PCI devices (e.g., SCSI controllers, network controllers, audio devices, etc.) may be coupled to the computer system via standard SCSI 211, IOC 212 and audio 213 ports. A second bridge 214 may be added to provide expansion PCI slots 215–217. Ports 218 and 219 are used to provide future growth and upgradeability for the computer system.

Figure 3:
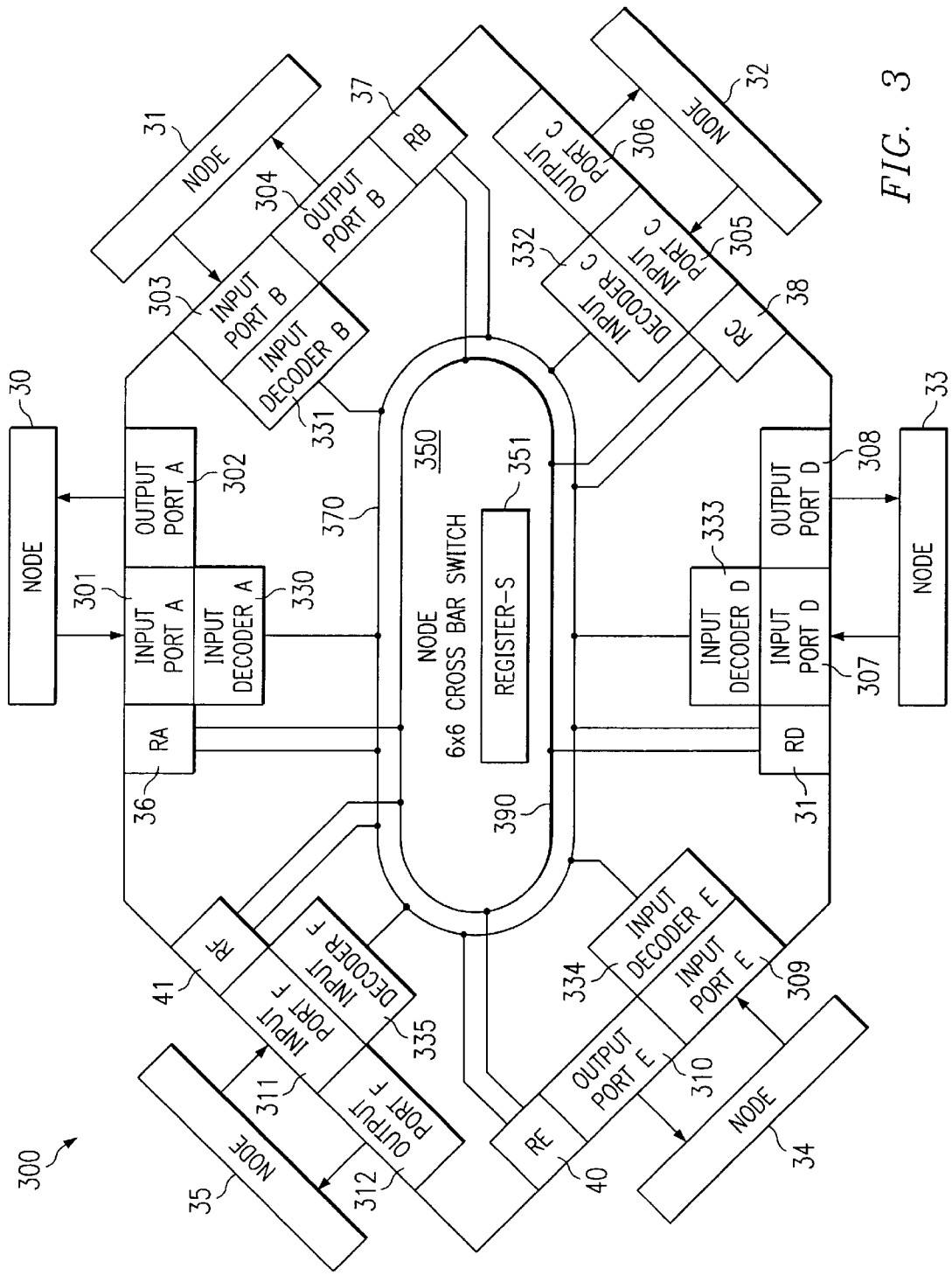
FIG. 3, is a high level block diagram of the present embodiment of crossbar bus network 300 in a computer system showing the flexibility of the present system and method.

The flexibility of the present system and method is more clearly shown in general FIG. 3, a high level block diagram of the present embodiment of crossbar bus network 300 in a computer system. Crossbar bus network 300 comprises node 30, node 31, node 32, node 33, node 34, node 35 and node 350. In this embodiment node 350 comprises a 6×6 crossbar switch circuit including input port A 301, output port A 302, input port B 303, output port B 304, input port C 305, output port C 306, input port D 307, output port D 308, input port E 309, output port E 310, input port F 311, output port F 312, input decoder A 330, input decoder B 331, input decoder C 332; input decoder D 333, input decoder E 334, input decoder F 335, port register A (RA) 36, port register B (RB) 37, port register C (RC) 38, port register D (RD) 39, port register E (RE) 40, port register F (RF) 41, switch register S 351, a first communications bus ring (referred to as command ring) 370 and a second communications bus ring (referred to as response ring) 390. Crossbar bus network 300 facilitates data communications between computer system devices or components connected to nodes 30 through 35 (30–35) by utilizing node 350 crossbar switch circuit to select and establish temporary links between the computer system devices or components.

Nodes 30–35 function as connection points, electrically coupling devices or components of crossbar bus network 300 to node 350 crossbar switch circuit. While crossbar bus network 300 tracks which component or device is attached to a node 30–35, there is no prerequisite that a particular component be connected to a particular node and in that sense the nodes 30–35 function as generic connections. In addition other embodiments utilize crossbar switch circuits capable of coupling more devices, for example a 12×12 crossbar switch circuit capable of coupling 12 devices. The other side of nodes 30–35 are electrically coupled to input and output ports of node 350 crossbar switch circuit. Node 30 is coupled to input port A 301 and output port A 302. Node 31 is coupled to input port B 303 and output port B 304. Node 32 is coupled to input port C 305 and output port C 306. Node 33 is coupled to input port D 307 and output port D 308. Node 34 is coupled to input port E 309 and output port E 310. Node 35 is coupled to input port F 311 and output port F 312. Thus, the nodes 30–35 of crossbar bus network 300 are coupled to node 350 crossbar switch circuit permitting node 350 to creates links between all the nodes.

Node 350 crossbar switch circuit functions as a communications hub for the crossbar bus network 300. Node 350 crossbar switch circuit is configured to provide a communication link between any two nodes included in crossbar bus network 300. Input ports and output ports 301–12 are gateway channels through which data communications flow into and out of crossbar switch circuit 350. Input decoders 330–335 facilitate the routing of messages within crossbar switch circuit 350. Port registers 36–41 and routing register S 351 store data utilized in controlling node 350 crossbar circuit functions. Command ring 370 is a communication bus ring dedicated to secondary high latency (e.g., PIO) communications between the input ports crossbar bus network 300 and port registers 36–41 and 351. Response ring 390 is a communication bus ring that handles secondary high latency (e.g., PIO) communications from port registers 36–41 and routing register 351 to other components of crossbar bus network 300. The switching matrix configuration and communication bus rings of node 350 crossbar switch circuit permit an increased level of communication versatility.

This communication versatility is possible because any input port included in crossbar switch circuit 350 can communicate with any output port at any time, as long as that output port is not busy. Thus, if node 30 is communicating with node 31, then node 32 can simultaneously communicate with node. 33, and node 34 can simultaneously communicate with node 35. This example only uses half of the crossbar's bandwidth since any given node is only using an output port or an input port. It is possible for all the nodes to be outputting and inputting at the same time because each node is connected to an independent input and output port. For example, when node 30 is utilizing input port A 301 to send data out on output port B 304 to node 31, node 31 can send data on input port B 303 through output port A 302 to node 30.

Figure 4:
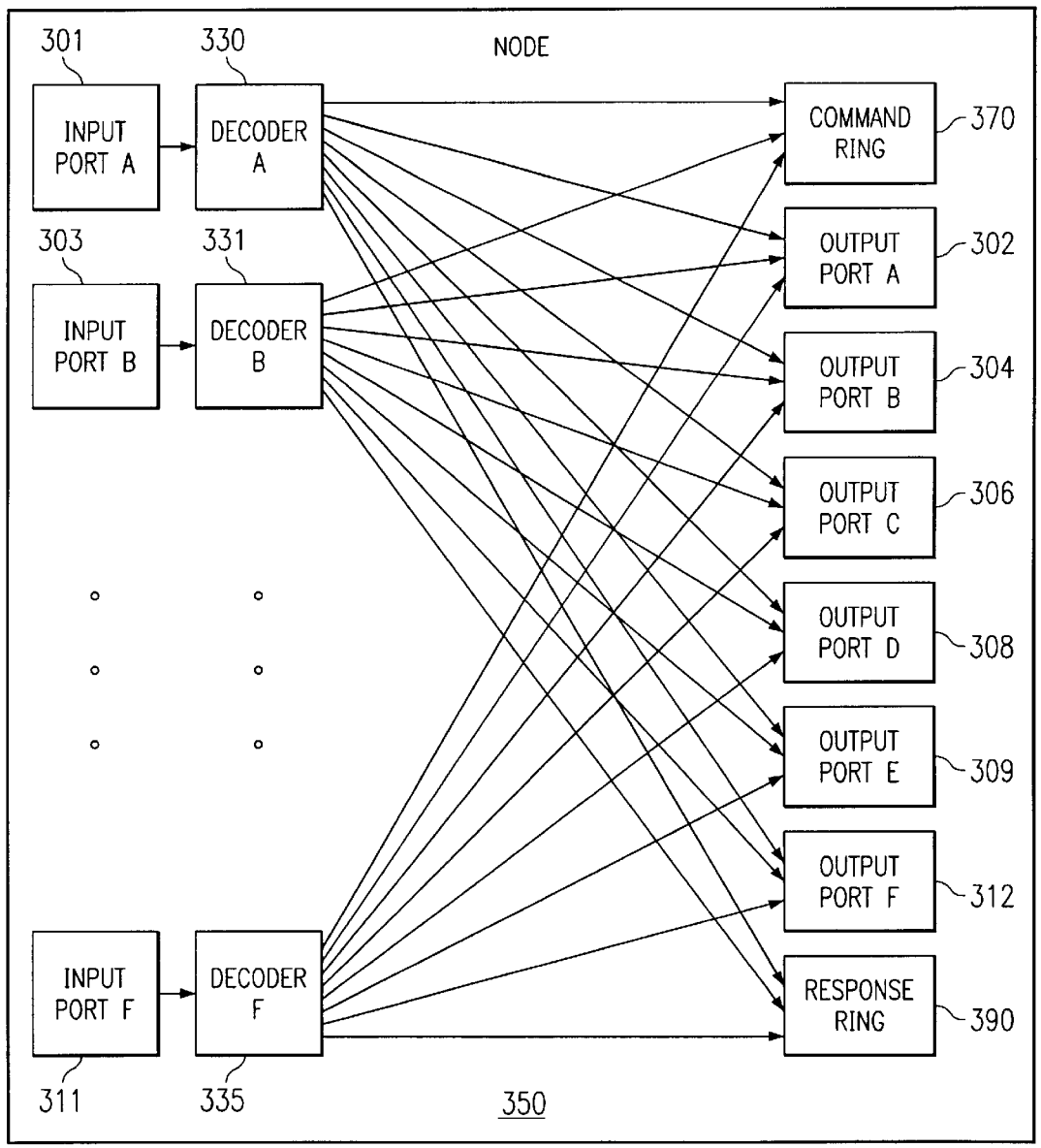
FIG. 4 is a block diagram schematic of the internal communication pathway organization of one embodiment of a crossbar switch circuit.

FIG. 4 is a block diagram showing a schematic of the internal communication pathway organization of node 350 crossbar switch circuit. The communication lines in FIG. 4 illustrate that crossbar circuit node 350 permits data placed on any input port by a node to be transmitted to any node via any output port. For example, if node 30 placed data on input port A 301 the data is transmitted to decoder component 330. Decoder component 330 deciphers which output port the data is intended for and forwards the data to the appropriate output port. At the same time node 30 could be receiving data since it is coupled to output port A 302. As FIG. 4 indicates, there are a number of potential link combinations and node 350 crossbar switch circuit must closely track the status of message traffic and maintain data on which nodes are coupled to which input and output ports.

Node 350 crossbar switch circuit utilizes port registers 36–41 and register S 351 (see FIG. 3) to participate in the control of node 350 crossbar circuit functions and maintain data on which nodes are coupled to which input and output ports. Port register A (RA) 36, port register B (RB) 37, port register C (RC) 38, port register D (RD) 39, port register E (RE) 40, and port register F (RF) 41 are also utilized in performance analysis and configuration of their respective ports. Routing register S 351 acts as a "routing table" that maps node names to crossbar ports and is used by node 350 crossbar switch circuit to determine which output ports data messages should be transmitted through. The contents of these registers are not necessarily predetermined or fixed and may need to be established or altered.

The content of the registers and control of the links in node 350 crossbar switch circuit are established and altered through command messages (e.g., write and read) and responses. A programmed, input/output (PIO) write operation transfers PIO data to a register (e.g., routing data from another node to routing register S 351). Once installed in a register, the data can be copied from node 350 crossbar switch circuit to any node in crossbar bus network 300. A programmed input/output (PIO) read operation copies routing data from a register to another node in crossbar bus network 300. The response exits node 350 crossbar switch circuit through the output port connected to the same node that originally sent the PIO read message.

In FIG. 3 for example, if node 31 wants to send routing data to node 350 crossbar switch circuit, node 31 sends a PIO write message addressed to routing register S 351. If node 30 wants to read the routing data or other contents of routing register S 351, node 30 sends a PIO read message with node 350 crossbar switch circuit as the final destination. Node 350 crossbar switch circuit interprets this signal as a PIO read operation directed to routing register S 351 and gets the routing data stored in routing register S 351. Node 350 crossbar switch circuit then sends the routing data back as a PIO response to node 30 through output port A 302. The PIO write and PIO read messages are conveyed through signals carried on an internal communication bus ring.

In the present embodiment the communication bus ring comprises command ring 370 and response ring 390. The communication bus rings are buses that permit data to be transmitted to and from the registers. For example, in the present embodiment, any node that can communicate to node 350 crossbar switch circuit can write routing data to routing register S 351 and establish which input port and output port is connected to a particular node. The communication bus rings further comprise a plurality of communication bus ring ramp components coupled in a daisy chain fashion to the communication bus ring. The communication bus ring ramp components participate communication routing. In the present embodiment the communication bus ring ramp components comprise a PIO write component (PIOW) and a PIO get component (PIOG).

Figure 5:
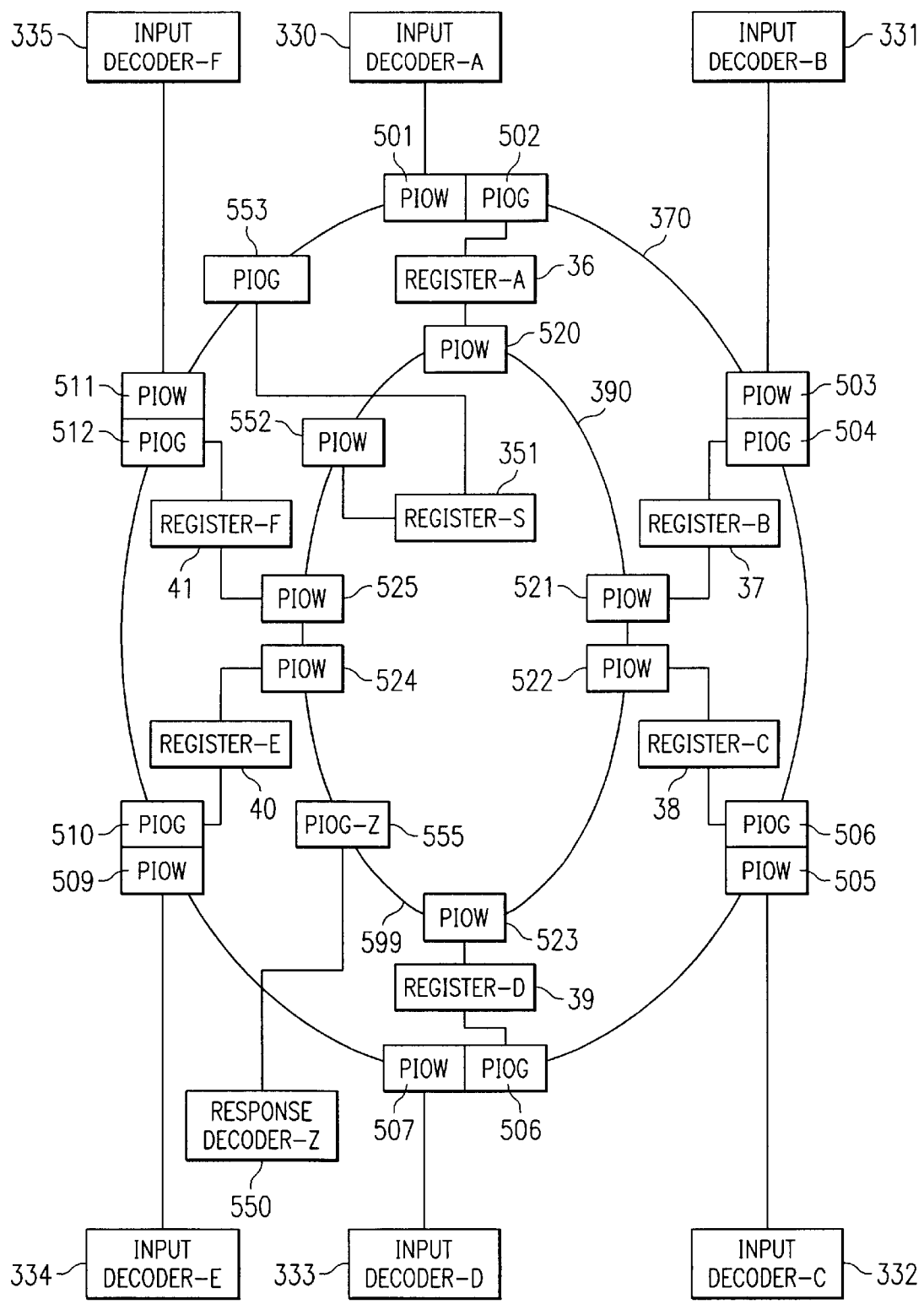
FIG. 5 is a block diagram showing a schematic of one embodiment of PIO command ring 370 and PIO response ring 390.

FIG. 5 is a block diagram showing a schematic of one embodiment of PIO command ring 370 and PIO response ring 390. Command ring 370 comprises write components PIOW 501, PIOG 502, PIOW 503, PIOG 504, PIOW 505, PIOG 506, PIOW 507, PIOG 508, PIOW 509, PIOG 510, PIOW 511, PIOG 512 and PIOG 351. Response ring 390 comprises PIOW 520, PIOW 521, PIOW 522, PIOW 523, PIOW 524, PIOW 525, PIOW 552 and PIOG-Z 555. The PIOG and PIOW ring components of the present embodiment are coupled to one of three functional kinds of structures, a decoder, a register or a response decoder.

Each input decoder is coupled to a PIOW that can place messages on command ring 370. For example, input decoder A 330 is coupled to PIOW 501, input decoder B 331 to POW 503, input decoder C 332 to PIOW 505, input decoder D 333 to PIOW 507, input decoder C 334 to PIOW 509, and input decoder F 335 is coupled to PIOW 511. Input decoders 330–335 use the respectively coupled PIOWs 501–511 to "write" (put) messages in the form of a first write signal on command ring 370.

Each register is coupled to a PIOG that can get messages from command ring 370 and a PIOW that can put messages on response ring 390. Port register A 36 is coupled to PIOG 502 and PIOW 520. Port register B 37 is coupled to PIOG 504 and PIOW 521. Port register C 38 is coupled to PIOG 506 and PIOW 522. Port register D 39 is coupled to PIOG 508 and PIOW 523. Port register E 40 is coupled to PIOG 510 and PIOW 524. Port register F 41 is coupled to PIOG 512 and PIOW 525. Register S 351 is coupled to PIOG 553 and PIOW 352. Port registers 3641 and register S 351 utilize the respectively coupled PIOGs 502-512 to get messages in the form of a first read signal off of command ring 370. The port registers 36–41 and register S 351 also utilize PIOWs 520–525 to "write" (put) messages on response ring 390.

Figure 6:
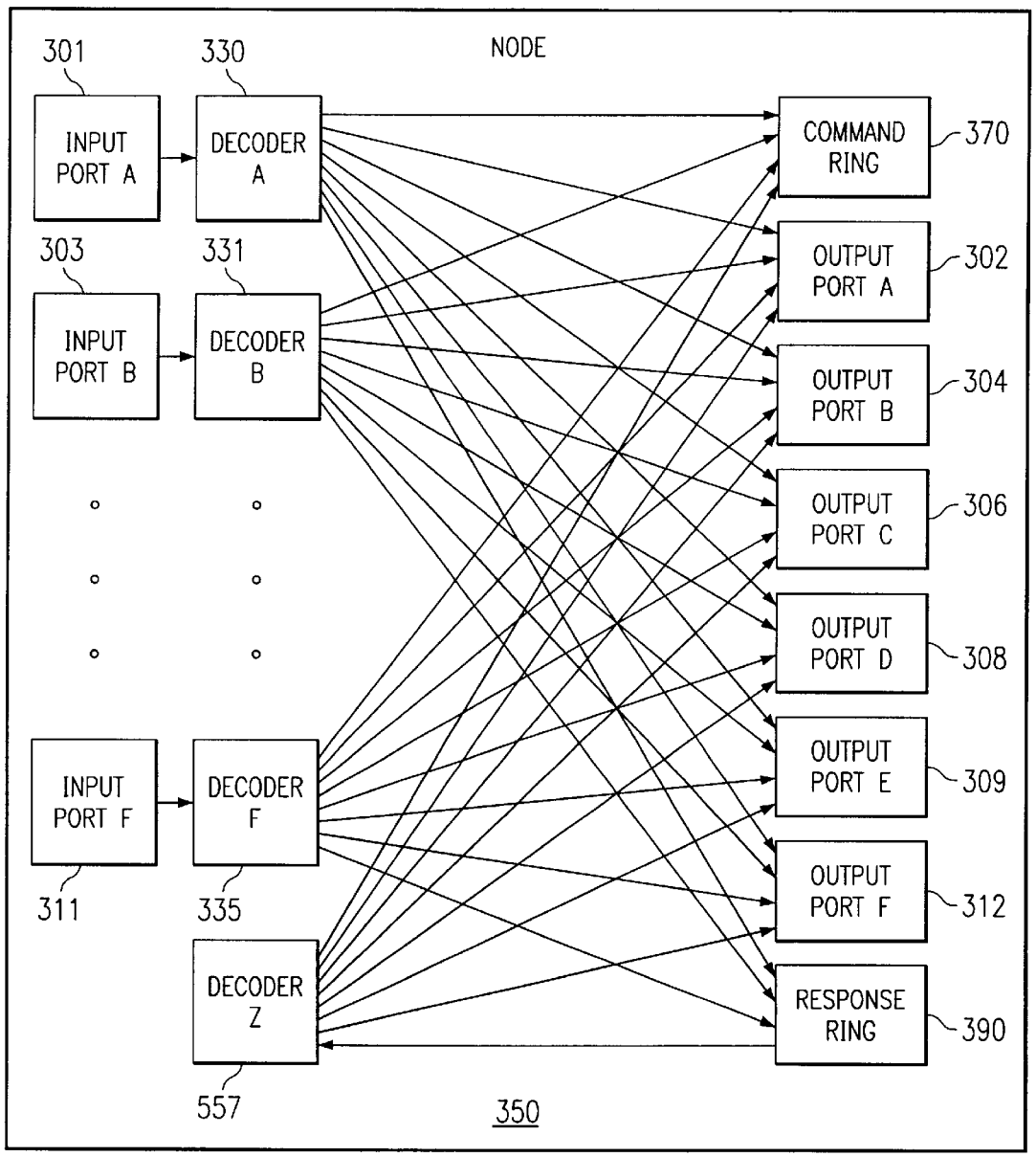
FIG. 6 is a block diagram illustrating that a response decoder in one embodiment operates in a manner similar to the other decoders of a crossbar switch circuit and sense data to output ports the links of the switching matrix.

Response decoder Z,557 is coupled to PIOG-Z 555 which is a special kind of ring component. Unlike the other PIOG components, PIOG-Z 555 is coupled to the response ring 390 and does not let messages flow through it. Section 599 of response ring only carries signals for arbitration purposes but no data flows through it because PIOG-Z 555 blocks all data. Response decoder Z 557 utilizes PIOG-Z 555 to get messages off of response ring 390. Response decoder Z 557 sends the response to an output port connected to the node that originally sent the request for PIO information. FIG. 6 illustrates that response decoder Z 557 operates similar to the other decoders of node 350 crossbar switch circuit and sends data to output ports over the links of the switching matrix.

In the present embodiment, PIO messages comprise a serial stream of bits representing PIO data and instructions. A PIO command message is comprised of several fields. The first field comprising 2 bits indicates the PIO message type. There are three PIO command message types: no message, write message, and read message. The second field in a PIO command message is an eight bit node name or identification (ID) of where to send the response if there is one. The third field of the message is a sixteen bit address related to a register in crossbar bus network 300. Crossbar bus network 300 utilizes PIO messages to notify components within crossbar bus network 300 of their required participation in PIO operations.

Figure 7:
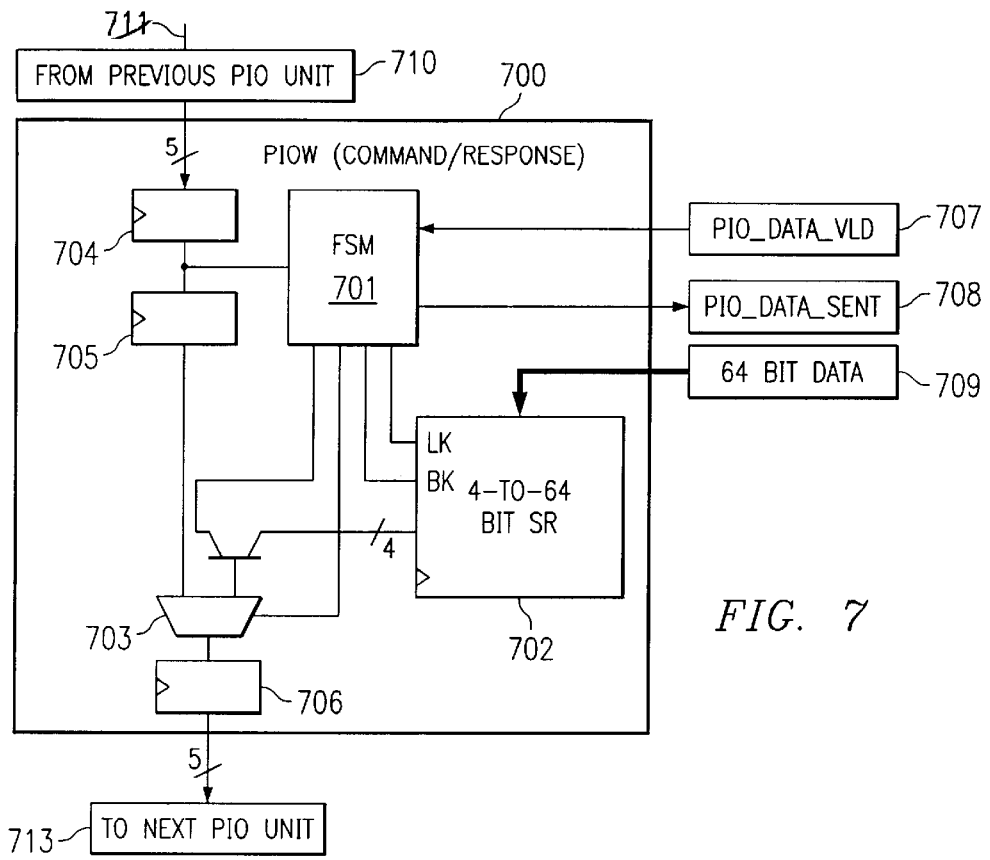
FIG. 7 is a block diagram schematic of one embodiment of a PIOW component 700 located on a PIO communications ring bus 711.

FIG. 7 is a block diagram schematic of one embodiment of a PIOW component 700 located on a PIO communications ring bus 711. In the present embodiment PIO communications ring bus 711 can be either PIO command ring 370 or PIO response ring 390. PIOW component 700 comprises finite state machine 701, bit shift register 702, multiplexer 703, and timing registers 704, 705 and 706. Finite state machine 701 is coupled to bit shift register 702, multiplexer 703, timing registers 704 and 705, and signals PIO__data__vld 707 and PIO__data__sent 708. Bit shift register 702 is a 4 to 64 bit shift register that is coupled to finite state machine 701, multiplexer 703 and sixty four bit data signal 709. Timing register 704 is coupled to timing register 705 which is coupled to multiplexer 703. Timing register 706 is coupled to multiplexer 703 and PIO communications ring bus 711.

PIO communication ring bus 711 carries a PIO message 710 from a previous PIO component to timing register 704. Timing register 704 stores the PIO message 710 for a period of time (usually a whole clock cycle between physical instances) in order to compensate and adjust for any delays associated with the duration of the transmission from the prior PIO component on PIO communication ring bus 711. PIO message 710 is then forwarded to finite state machine 701 and timing register 705. Timing register 705 stores PIO message 710 for a period of time sufficient for state machine 701 to perform its operations.

Finite state machine 701 examines the first field of PIO message 710 to determine if PIO communication ring bus 711 is available for a new message originating in PIOW 700 to be put on communications ring bus 711. If the first field indicates that PIO communication ring bus 711 is not available the finite state machine 701 determines if the PIO message 710 occupying the communication ring bus 711 originated from PIOW 700. If the PIO message 710 did not originate at PIOW 700, then the PIO message 710 proceeds through timing register 705, multiplexer 703, timing register 706 and back onto PIO communication ring bus 711. PIO message 710 is transmitted onto the next PIO component on the PIO communication ring bus 711 without any changes being made to the PIO message 710.

If the first field indicates that PIO communication ring bus 711 is available or if the PIO message 710 originated at PIOW 700, finite state machine 701 checks signal PIO__data__vld 707 from a component of crossbar bus network 300 (e.g., routing register s 350 or output port register A (RA) 36) to determine if the component has a PIO message to place on PIO communication ring bus 711, such as a command or a response. If a crossbar bus network 300 component does not have a PIO message to place on PIO communication ring bus 711, finite state machine 701 causes a PIO message that indicates the communication bus ring 711 is available to flow through multiplexer 703, timing register 706 and back onto PIO communication ring bus 711.

If the first field in PIO message 710 indicates that PIO communication ring bus 711 is available and if a crossbar bus network 300 component (not shown) coupled to PIOW 700 has a PIO message to place on PIO communication ring bus 711, finite state machine 701 asserts a load enable in bit shift register 702. This permits data signal 709 to be loaded in bit shift register 702. If a crossbar bus network 300 component (e.g. routing register S 351 or port register A 36) has a PIO message to place on PIO communication ring bus 711, such as a command or a response, the finite state machine 701 asserts a shift enable on bit shift register 702 that transfers the data in bit shift register 702 to multiplexer 703. Finite state machine 701 also sends a signal to switch multiplexer 703 so that the data shifted from bit shift register 702 is forwarded to timing register 706.

Timing register 706 stores the information for a period of time sufficient to compensate and adjust for any delays through PIOW 700. The PIO message 713 that comes out of PIOW 700 and is forwarded on to the next PIO component attached to PIO communications ring bus 711. The contents of PIO message 713 is either the same as PIO message 710 or a new PIO message generated by PIOW 700 which can comprise a forth field containing new data or a first field that indicates the communications ring bus 711 is available.

Figure 8:
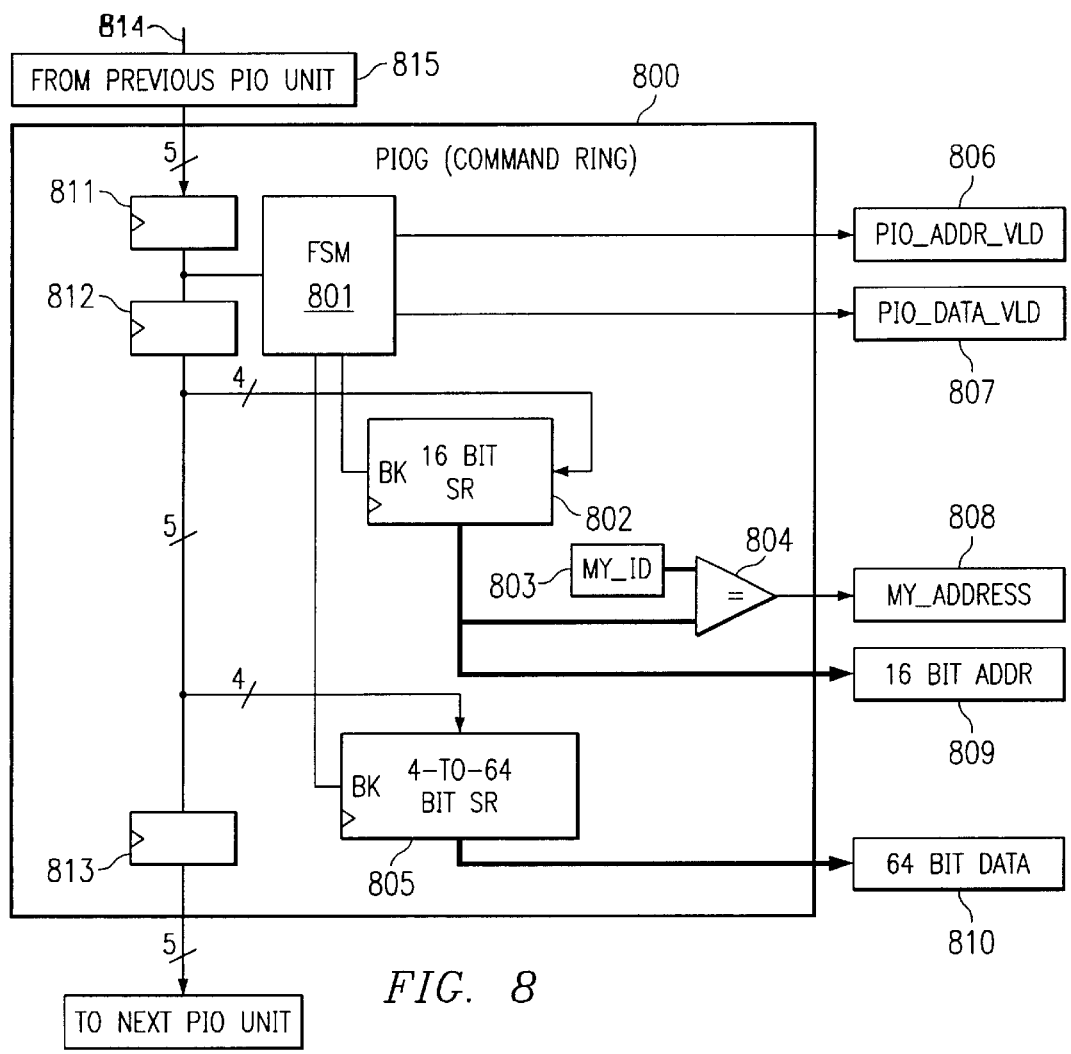
FIG. 8 is a block-diagram schematic of one embodiment of a PIOG component 900 located on a PIO communications ring bus 814.

FIG. 8 is a block diagram schematic of one embodiment of a PIOG component 800 located on a PIO communications ring bus 814. PIOG component 800 comprises finite state machine 801, an address bit shift register 802, a data bit shift register 805, My-ID signal 803, comparator 804, and timing registers 811, 812 and 813. Finite state machine 801 is coupled to address bit shift register 802, data bit shift register 805 and timing registers 811 and 812, and signals PIO__addr__vld 806 and PIO__data__vld 807. Address bit shift register 802 is a 16 bit shift register that is coupled to finite state machine 801, comparator 804, 16 bit__addr signal 809, and timing registers 812 and 813. Comparator 804 is coupled to address bit shift register 802, my__id signal 803, my address signal 808 and 16 bit__addr signal 809. Data bit shift register 805 is coupled to finite state machine 801, 64 bit data signal 810 and timing registers 812 and 813. Timing register 811 is coupled to timing register 812 which is coupled to timing register 813 which is coupled to PIO communications ring bus 814. In another embodiment bit shift register 802 is a different sixe (e.g., 32 bits) and the signals such as bit-addr signal 809 or data signal 810 are a different size.

PIO communication ring bus 814 carries a PIO message 815 from a previous PIO component to timing register 811. Timing register 811 stores the PIO message 815 for a period of time (usually one clock cycle) in order to compensate and adjust for any delays associated with the duration of the transmission from the prior PIO component on PIO communication ring bus 814. PIO message 815 is then forwarded to finite state machine 801 and timing register 812. The PIO message is stored in timing register 812 for a period of time to permit finite state machine 801 to perform its operations and then it is sent to timing register 813. Timing register 813 stores the information for a period of time sufficient to compensate and adjust for any delays associated with transmission delays through PIOG 800. Then PIO message 815 proceeds through timing register 812 and 813 back onto PIO communication ring bus 814 without any changes being made to the information in the PIO message 815.

Finite state machine 801 examines the grant field of the PIO message 815 to determine if PIO message 815 is a PIO command. If the grant field indicates that PIO message 815 is a PIO command, finite state machine 801 checks the address field of PIO message 815 to determine if it is the same as an address in the set of valid addresses PIOG 800 will respond to. If the address field does not match one in the set of valid addresses finite state machine 801 does nothing. If the address field does match one in the set of valid addresses finite state machine 801 sends a PIO_addr_vld signal 806 to another component of crossbar bus network 300 (e.g., port register A (RA) 36), to indicate the address in the PIO message is a valid match. Finite state machine 801 also enables address bit shift register 802 and data bit shift register 805. Bit shift register 802 shifts the address in the third field of PIO message 814 onto bit_addr signal 809. Data bit shift register 805 shifts the 64 bit data field of PIO message 814 onto bit data signal 810. Both bit data signal 810 and bit_addr signal 809 are coupled to the other crossbar bus network 300 components (e.g., port register A (RA) 36).

Finite state machine 801 also enables address bit sift register 802 which shifts the ID in the second field of PIO message 814 to comparator 804. Comparator 804 compares My_ID signal 803 to the ID in the second field of PIO message 814. If the two identification data match, comparator 804 sends a my-address signal 808 indicating the match is valid and the 64 bits of data transmitted via signal 810 is accepted (e.g., stored) in the crossbar network 300 component at the 16 bit address on bit addr signal 809. If the two identifications do not match the 64 bits of data transmitted via signal 810 is not accepted (e.g., stored) in the crossbar network 300 component.

Figure 9:
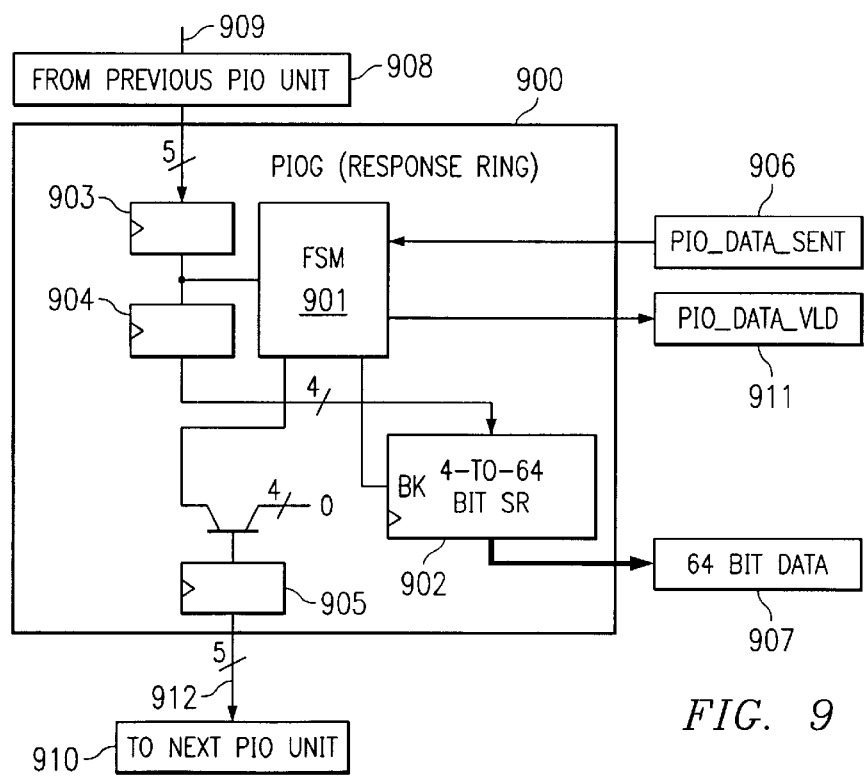
FIG. 9 is a block diagram schematic of one embodiment of a PIOG component 900 located on a PIO response communications ring bus 909.

FIG. 9 is a block diagram schematic of one embodiment of a PIOG-Z component 900 located on a PIO response communications ring bus 909. PIOG component 900 comprises finite state machine 901, bit shift register 902, and timing registers 903, 904 and 905. Finite state machine 901 is coupled to bit shift register 902, and timing registers 903, 904 and 905, and signals PIO_data_sent 906 and PIO_data_vld 911. Bit shift register 902 is a 64 bit shift register that is coupled to finite state machine 901, 64 bit data signal 907, and timing registers 904 and 905. Timing register 905 is coupled to bus 912.

PIO communication ring bus 909 carries a PIO message 908 from a previous PIO component to timing register 903. Timing register 903 stores the PIO message 908 for a period of time (usually one clock cycle) in order to compensate and adjust for any delays associated with the duration of the transmission from the prior PIO component on PIO communication ring bus 909. PIO message 908 is then forwarded to finite state machine 901 and timing register 904. The PIO message is stored in timing register 904 for a period of time to permit finite state machine 901 to perform its operations and then it is sent to bit shift register 902. Timing register 905 stores the information for a period of time sufficient to compensate and adjust for any delays associated with transmission delays through PIOG 900.

Finite state machine 901 examines the grant field of the PIO message 908 to determine if PIO message 908 is a PIO command. If the grant field indicates that PIO message 908 is not a PIO command, finite state machine 901 forwards a bus available message to the next PIO component on PIO response ring 390. If the grant field indicates that PIO message 908 is a PIO command finite state machine 901 sends a PIO_data_vld signal 911 to another component of crossbar bus network 300 (e.g., port register A (RA) 36), to indicate data is being forwarded. Finite state machine 901 also enables address bit sift register 902 which shifts the PIO message 908 to a response decoder. As previously indicated, the response decoder transmits the response message to the same node that issued the command that triggered the response message. Finite state machine 901 then forwards a PIO message to timing register 905 that indicates PIO communications ring bus 909 is available.

In the present embodiment the programmed input/output operations are not considered a critical function in crossbar bus network 300. The reason the programmed input/output operations are not considered critical is the need for any node, other than node 350 crossbar switch circuit, to have data on which input ports and output ports of node 350 are mapped to a node is less important than those other nodes efficiently communicating data regarding their primary functions in the computer system. Therefore, the communication involved with programmed input/output operations do not require large bandwidth or low latency in the present embodiment. Thus, the communications ring bus in node 350 crossbar switch circuit that connects each of the internal structures that participates in programmed input/output operations is relatively narrow. In other embodiments requiring greater bandwidth and lower latency than the present embodiment, a larger bus is used to connect each of the internal structures that participates in programmed input/output operations.

Figure 10:
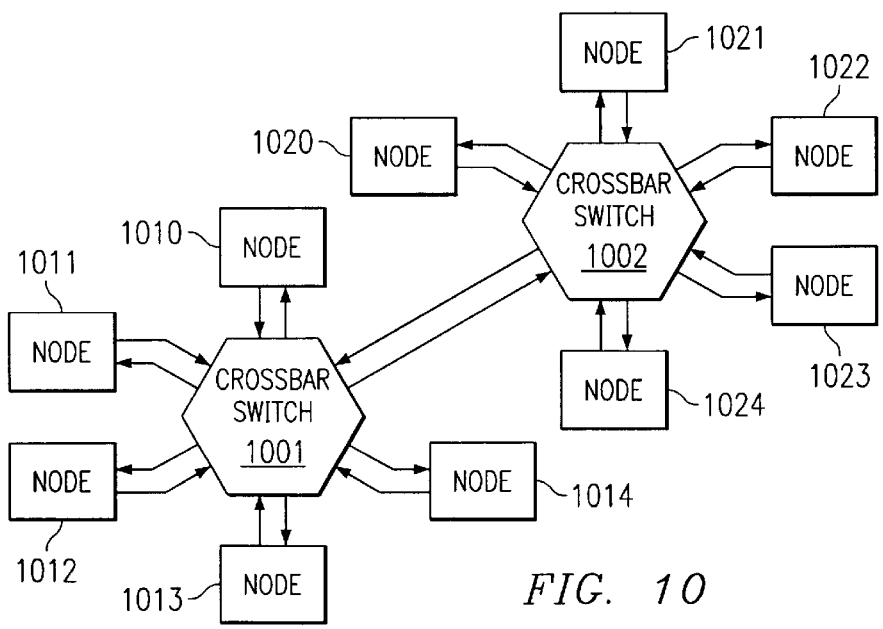
FIG. 10 is a block diagram of another embodiment of crossbar bus network 1000.

FIG. 10 is a block diagram of another embodiment, crossbar bus network 1000. Crossbar bus-network 1000 comprises node 1001, node 1002, node 1010, node 1011, node 1012, node 1013, node 1014, node 1020, node 1021, node 1022, node 1023, and node 1024. In this embodiment nodes 1001 and 1002 are 6×6 crossbars. Two 6×6 crossbar switch circuits are required to be coupled together in this embodiment because there are ten other nodes (devices) that need to communicate with one another and one 6×6 crossbar switch circuit can only accommodate six nodes (devices). The 6×6 crossbar switch circuits in this embodiment (nodes X01 and X10) are similar to node 350 crossbar switch circuit and include communication bus rings.

Each crossbar switch circuit in crossbar bus network 1000 has six input ports and six output ports, and they function as communication hubs that are configured to provide a data communication path between any two nodes included in the crossbar circuit. Any input port can communicate with any output port at any time, as long as that output port is not busy. For example, if a device at node 1014 wants to send a message to a device at node 1023 it must indicate node 1023 is the destination. The message will travel through node 1001 and node 1002 to node 1023. Messages on the communication bus rings can also be sent between node 1001 and 1002 by utilizing the input and output ports coupling nodes 1001 and 1002. For example a PIO read command from node 1012 to node 1002 is put on the command ring of node 1001 and taken off by a PIO get component associated with the output port coupled to node 1002. The read command is transmitted to the input port of node 1002 coupled to node 1001 and the read message is inserted on node 1002's command ring by a PIO write component.

Figure 11:
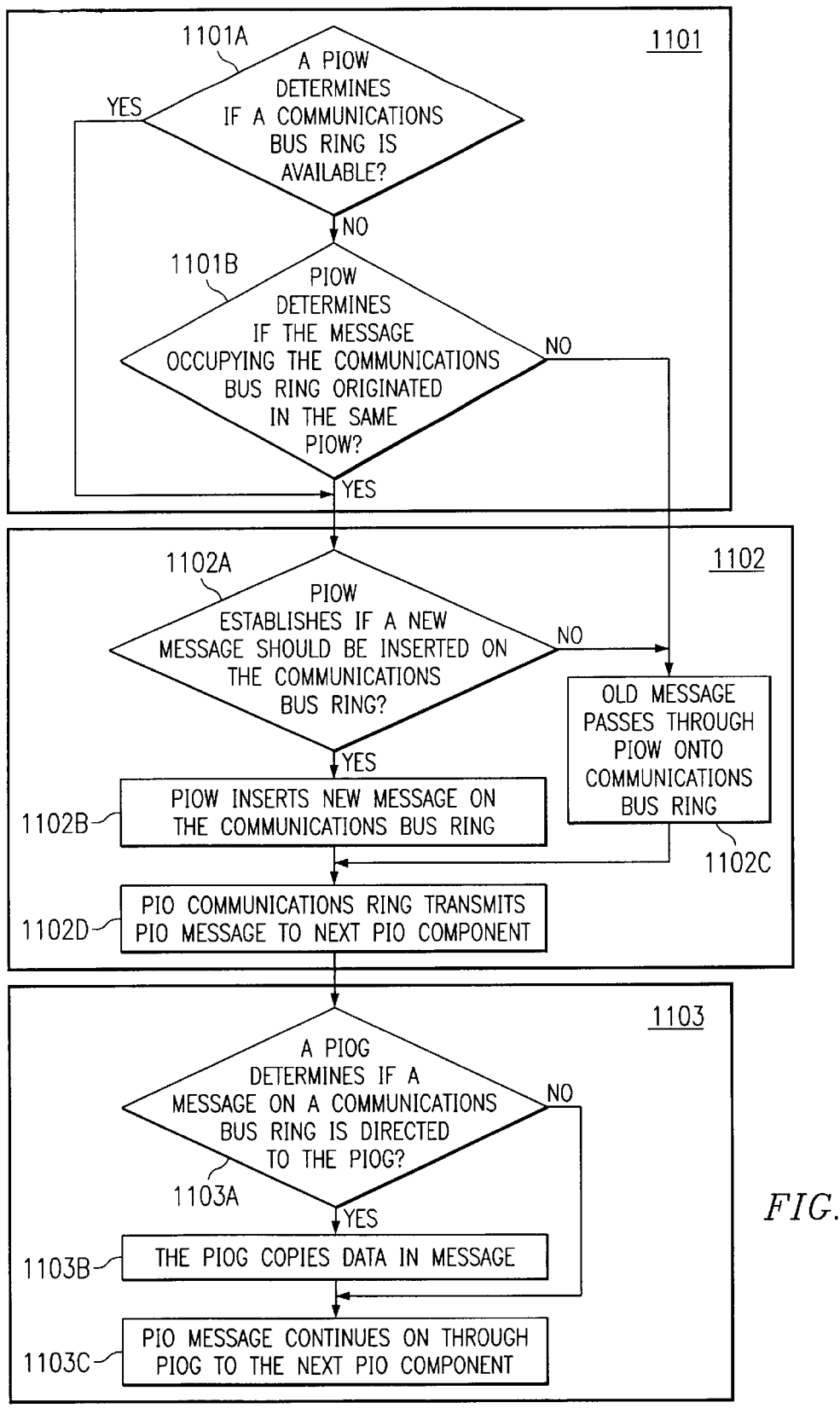
FIG. 11 is a flow chart illustrating the steps of one embodiment of the present method, crossbar bus network method 1100.

FIG. 11 is a flow chart illustrating the steps of one embodiment of the present method, crossbar bus network method 1100. Crossbar bus network method 1100 is a method for communicating messages between a plurality of crossbar bus network components in which more than one message can be communicated at the same time. In particular, the present embodiment is a method for communicating PIO messages on communication bus rings.

In step 1101 the availability of a communications bus ring is determined. This determination is made by a PIOW component by examining the first field of a PIO message in step 1101A. If the field indicates the communication bus ring is not available the PIOW component determines if the message occupying the communication bus ring originated in the same PIOW component in step 1101B. If it did, the communication bus ring is available to this PIOW component because the fact that the message made it all the way around the communication bus ring means the component it was sent to must have received it already and a new message can be inserted by the PIOW component.

In step 1102 a message is inserted on the communications bus ring. In the present embodiment the PIOW establishes if a new message should be inserted on the communications bus ring in step 1102A. The PIOW checks if its associated crossbar network component wants to insert a new message on the ring. If the crossbar network component wants to insert a message on the ring the PIOW inserts a message in step 1102B. Even if the crossbar network component does not have new data to insert on the communication bus ring, the PIOW inserts a new message granting bus access to other components if the current message occupying the communications bus ring originated in the present PIOW. In step 1102C, an old message is inserted back on the communications ring if the communications ring bus was not available in the step 1101 or if the present PIOW determines a new message should not be inserted on the communications bus ring. In step 1102D the communications bus ring transmits a message on to the next communications bus ring ramp component.

The present method utilizes a distributed arbitration process to determine the availability of communications bus ring. There are other embodiments that utilize different arbitration processes. For example, an arbitration system that permits more than one packet of data (e.g., message) on the PIO communications ring bus simultaneously by providing a more elaborate coordination through intermittent stacking on the bus avoids having to wait until one message gets all the way around the PIO communications ring.

In step 1103 a message is received. In the present embodiment the message is received by a PIOG component. In step 1103A the PIOG component determines if a message on the communications bus ring is directed to the PIOG. If the message is directed to the PIOG, in step 1103B the PIOG copies the data in the message. If the message was not directed to PIOG or after a message directed to the PIOG is copied, in step 1103C the PIOG permits the message to proceed on the communications bus ring.

In an alternate embodiment, messages are effectively removed from the communications bus ring. This is accomplished by including a step in which a PIOG determines if a message is directed to it. If the message is directed to the PIOG the message is removed from the communications bus ring and a new message indicating that the communications bus ring is available is inserted with no data attached.

The present invention is an efficient system and method that increases bandwidth by permitting multiple components to effectively communicate with one another at the same time. These communications take place in a multi-link network architecture utilizing a switching matrix configuration that includes a dedicated communications bus ring. The communications bus ring is used as a path that permits simultaneous communications to a particular device. For example, secondary high latency data communications can be communicated on the communications bus ring, thereby freeing switching matrix links of the crossbar switch circuit for other simultaneous communications. Thus the present system and method is capable of providing high speed data communications with low latency characteristics in a reliable, cost effective, and efficient manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A crossbar switch circuit in a crossbar bus network of nodes adapted to couple crossbar bus network components, including the crossbar switch circuit, to the crossbar bus network, comprising:

a plurality of input ports, each of said plurality of input ports operable to receive messages from a crossbar bus network component at an associated node;

a plurality of output ports, each of said plurality of output ports operable to transmit messages to a crossbar bus network component at an associated node;

a switching matrix adapted to implement multiple links that couple said plurality of input ports to said plurality of output ports and provide communication paths for messages to travel from said plurality of input ports to said plurality of output ports simultaneously; and a communications bus ring separate from said links of switching matrix and adapted to provide an alternate communications path for transmitting messages between crossbar bus network components at said nodes of said crossbar bus network, said communications bus ring coupled to said plurality of input ports.

2. The crossbar switch circuit of claim 1 wherein said communications bus ring further comprises a communications bus ring ramp component.

3. The crossbar switch circuit of claim 2 wherein said communications ring bus ramp component comprises a write component for inserting messages on said communications bus ring.

4. The crossbar switch circuit of claim 3 wherein said write component comprises:

a finite state machine adapted to control said write component;

a multiplexer coupled to said finite state machine and adapted to select one of a plurality of signals;

a bit shift register coupled to said finite state machine, said bit shift register adapted to receive a data signal from a crossbar bus network component and transmit said data signal to said communications bus ring;

a timing register coupled to said finite state machine, said timing register adapted to compensate for timing synchronization resulting delays incurred as a message travels through said crossbar communication bus ring.

5. The crossbar switch circuit of claim 2 wherein said communications ring bus ramp component comprises a get component for copying messages from said communications bus ring.

6. The crossbar switch circuit of claim 5 wherein said get component forwards the message to a crossbar bus network component.

7. The crossbar switch circuit of claim 5 wherein said get component forwards the message on said communications bus ring.

8. The crossbar switch circuit of claim 7 wherein said get component comprises:
   a finite state machine adapted to control said get component;
   an address bit shift register coupled to said finite state machine, said address bit shift register adapted to receive an address signal from said communications bus ring and transmit said address signal onto a crossbar bus network component;
   a data bit shift register adapted to receive a data signal from said communications bus ring and transmit said data signal to said crossbar bus network component,
   a comparator coupled to said finite state machine, said comparator adapted to compare an identification field of the message to an identification of said bus ring ramp component; and
   a timing register coupled to said finite state machine, said timing register adapted to compensate for timing synchronization resulting in delays incurred as a message travels through said crossbar communications bus ring.

9. A crossbar switch circuit in a crossbar bus network of nodes adapted to couple crossbar bus network components, including the crossbar switch circuit, to the crossbar bus network, comprising:
   a plurality of input ports, each of said plurality of input ports operable to receive messages from a crossbar bus network component at an associated node;
   a plurality of output ports, each of said plurality of output ports operable to transmit messages to a crossbar bus network component at an associated node;
   a switching matrix adapted to implement multiple links that couple said input ports to said output ports and provide communication paths for messages to travel from said input ports to said output ports simultaneously; and
   a communications bus ring separate from said links of said switching matrix and adapted to provide an alternate communications path for transmitting messages between crossbar bus network components at said nodes of said crossbar bus network, said communications bus ring coupled to said input ports;
   wherein said communications bus ring further comprises a communications bus ring ramp component;
   wherein said communications ring bus ramp component comprises a get component for copying messages from said communications bus ring;
   wherein said communications bus ring ramp component does not forward the message on and removes the message from the communications bus ring.

10. The crossbar switch circuit of claim 9 wherein said communications bus ring ramp component comprises:
    a finite state machine adapted to control said communications bus ring ramp component;
    a data bit shift register adapted to receive a data signal from said communications bus ring and transmit said data signal onto a crossbar bus network component; and
    a timing register coupled to said finite state machine, said timing register adapted to compensate for timing synchronization resulting delays incurred as a message travels through said crossbar communication bus ring.

11. The crossbar switch circuit of claim 9 wherein said communications bus ring ramp component inserts a message on the communications bus ring indicating the communications bus ring is available for other communications bus ring ramp components to insert messages on the communication bus ring.

12. A crossbar bus network, comprising:
    a first node adapted to couple a first crossbar bus network component to said crossbar bus network;
    a second node adapted to couple a second crossbar bus network component to said crossbar bus network;
    a crossbar switch circuit coupled to said first node and said second node, said crossbar switch circuit including a switching matrix with communication links adapted to route messages to and from said first node and said second node simultaneously, said crossbar switch circuit including a communications bus ring separate from said communication links of said switching matrix and adapted to provide an alternate communications path for transmitting messages between said first and second nodes.

13. The crossbar bus network of claim 12 wherein said crossbar switch circuit further comprises a communications bus ring adapted to transmit data between components of said crossbar switch circuit.

14. The crossbar bus network of claim 13 wherein said communications bus ring further comprises a command ring for transmitting messages related to programmed input/output (PIO) commands.

15. The crossbar bus network of claim 14 wherein said PIO commands comprise write commands.

16. The crossbar bus network of claim 14 wherein said PIO commands comprise read commands.

17. The crossbar but network of claim 13 wherein said communications bus ring further comprises a response communications bus ring for transmitting messages related to programmed input/output (PIO) responses.

18. The crossbar bus network of claim 17 wherein said PIO responses result from PIO read commands.

19. Presented) In a crossbar bus network, a method for communicating messages between a plurality of crossbar bus network components in which multiple links are established via a crossbar switch circuit and more than one message can be communicated at the same time to a particular component of the crossbar bus network, comprising the steps of:
    providing a communications bus ring adapted to provide an alternate communications path for transmitting messages between crossbar bus network components of said crossbar bus network apart from message communication through said crossbar switch circuit;
    determining if said communications bus ring is available;
    inserting messages on said communications bus ring;
    receiving message from said communications bus ring.

20. The crossbar bus network method of claim 19, the determining step further comprising:
    determining if a message occupying said communications bus ring originated in the same communications bus ring ramp component.

21. The crossbar bus network method of claim 19, the determining step further comprising:
    passing old message on said communications bus ring through a communications bus ring component.

22. The crossbar bus network method of claim 19, the determining step further comprising:

arbitrating for access to said communications bus ring.

23. The crossbar bus network method of claim 19, the inserting step further comprises:

deciding if a network component wants to put a new message on said communication bus ring; and inserting new message on said communications bus ring.

24. The crossbar bus network method of claim 19, the receiving step further comprises:

establishing if a message occupying said communications bus ring originated in said communications ring bus component.

* * * * *

UNITED STATES PATENT AND TRADEMARK OFFICE
CERTIFICATE OF CORRECTION

PATENT NO. : 6,728,206 B1  Page 1 of 1
APPLICATION NO. : 09/128392
DATED : April 27, 2004
INVENTOR(S) : John R. Carlson It is certified that error appears in the above-identified patent and that said Letters Patent is hereby corrected as shown below:

<u>Title Page, at Item (73) Assignee:</u>
Delete "Silicon Grpahics, Inc." and insert --Silicon Graphics, Inc.--.

Signed and Sealed this

Twenty-seventh Day of May, 2008

JON W. DUDAS
*Director of the United States Patent and Trademark Office*